(12) United States Patent
Gunasekara et al.

(10) Patent No.: US 9,900,822 B2
(45) Date of Patent: Feb. 20, 2018

(54) WIRELESS GATEWAY, NETWORK HANDOFFS, AND LINK MANAGEMENT

(71) Applicant: Time Warner Cable Enterprises LLC, New York, NY (US)

(72) Inventors: Don Gunasekara, Reston, VA (US); Kiran R. Yeddala, Ashburn, VA (US); Ahmed Bencheikh, Fairfax Station, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 34 days.

(21) Appl. No.: 15/190,549

(22) Filed: Jun. 23, 2016

(65) Prior Publication Data

US 2016/0309388 A1 Oct. 20, 2016

Related U.S. Application Data

(63) Continuation of application No. 14/208,366, filed on Mar. 13, 2014, now Pat. No. 9,392,632.

(51) Int. Cl.
| | |
|---|---|
| *H04W 4/00* | (2009.01) |
| *H04W 36/36* | (2009.01) |
| *H04W 76/02* | (2009.01) |
| *H04W 8/18* | (2009.01) |
| *H04W 36/32* | (2009.01) |
| *H04W 48/12* | (2009.01) |
| *H04W 36/00* | (2009.01) |
| *H04W 88/16* | (2009.01) |

(52) U.S. Cl.
CPC .......... *H04W 36/365* (2013.01); *H04W 8/18* (2013.01); *H04W 36/0005* (2013.01); *H04W 36/32* (2013.01); *H04W 48/12* (2013.01); *H04W 76/025* (2013.01); *H04W 88/16* (2013.01)

(58) Field of Classification Search
CPC . H04W 88/16; H04W 76/04; H04W 36/0033; H04W 36/00; H04W 36/14; H04W 48/18; H04W 88/08; H04W 40/246; H04W 40/248; H04W 4/02; H04W 76/02; H04W 84/00; H04W 12/06; H04W 36/0005; H04W 92/02
USPC .......................... 455/436–444; 370/321–324
See application file for complete search history.

(56) References Cited

U.S. PATENT DOCUMENTS

| | | | |
|---|---|---|---|
| 2001/0048686 A1* | 12/2001 | Takeda | H04L 12/66 370/401 |
| 2008/0081625 A1* | 4/2008 | Ergen | H04W 36/0083 455/436 |
| 2008/0132240 A1 | 6/2008 | Baek | |

(Continued)

*Primary Examiner* — Ronald Eisner
(74) *Attorney, Agent, or Firm* — Chapin IP Law, LLC

(57) ABSTRACT

A wireless gateway disposed in a subscriber domain detects presence of a communication device communicating in a vicinity of the subscriber domain over a first wireless communication link such as a wireless cellular phone link. In response to detecting the communication device in the subscriber domain, the wireless gateway provides notification of a presence of the wireless gateway hardware to the communication device. The wireless gateway participates in establishing a second wireless communication link between the communication device and the wireless gateway to facilitate a handoff of a communication session from the first wireless communication link to the second wireless communication link.

30 Claims, 7 Drawing Sheets

(56) References Cited

U.S. PATENT DOCUMENTS

| | | |
|---|---|---|
| 2008/0227452 A1 | 9/2008 | Sayeedi |
| 2010/0037265 A1 | 2/2010 | Amir et al. |
| 2010/0049859 A1 | 2/2010 | Peterson et al. |
| 2013/0303188 A1 | 11/2013 | Butala |

* cited by examiner

MAPPING INFO.
120-1

WIRELESS GATEWAY: 140-1 ( XYZ )

| MOBILE COMMUNICATION DEVICE | ASSIGNED VALUE | CELL PHONE SERVICE PROVIDER | CARRIER FREQUENCY SPECTRUM |
|---|---|---|---|
| 110-1 | UNIQUE ID. VALUE: ABCD | COMPANY A | 700 MHZ / 1800 MHZ |
| 110-2 | UNIQUE ID. VALUE: AB34 | COMPANY B | 2.5 GHZ |
| ... | ... | ... | ... |

FIG. 2

WIRELESS GATEWAY, NETWORK HANDOFFS, AND LINK MANAGEMENT

RELATED APPLICATIONS

This application is a continuation of U.S. Provisional patent application Ser. No. 14/208,366 entitled "WIRELESS GATEWAY, NETWORK HANDOFFS, AND LINK MANAGEMENT," filed on Mar. 13, 2014, the entire teachings of which are incorporated herein by this reference.

BACKGROUND

In general, current technology enables a respective operator of a communication device such as a cell phone to communicate over different type of wireless networks. For example, a respective mobile communication device such as a cellular phone, tablet computer, etc., can include a first RF (Radio Frequency) interface supporting cellular phone connectivity and a second RF interface to support WiFi™ connectivity. The operator of the communication device can manually select amongst the different available communication modes to wirelessly communicate with a target device.

As an example, an operator of a respective communication device can choose to initially communicate over a cellular phone link using the first RF interface. In such a mode, the operator can dial a phone number to make a phone call. As an alternative to voice communications, if desired, the user of the communication device can execute a browser application and use the cellular phone link to retrieve content over a respective data link from one or more different remote servers. Thus, in certain instances, a cellular phone link can be used to retrieve content over a network such as the Internet.

Typically, cellular phone links support long-range communications such as distances greater than 1 mile. In general, because cellular phone links support such long-range communications, the communication device is more likely to be able to connect to the Internet and retrieve content regardless of the location of the communication device in a geographical region.

As mentioned above, a respective communication device can also include an RF interface to communicate over a WiFi™ communication link. As an alternative to using a cellular phone link, if a WiFi™ access point is available in the region in which the communication device resides, the operator of the respective communication device can establish a WiFi™ communication link to retrieve content from one or more remote servers in a network as an alternative to retrieving content over a cellular phone link. Typically, in an outdoor environment, WiFi™ supports only short-range communications such as distances less than a few hundred feet. Indoors, WiFi™ supports a substantially shorter range of connectivity.

Because it is typically more expensive to communicate with a target device such as a remote server using a cellular phone communication link than a WiFi™ communication link, if available, a respective operator usually will typically prefer to communicate over a respective WiFi™ communication link as opposed to communicating over a cellular phone communication link.

BRIEF DESCRIPTION OF EMBODIMENTS

Conventional techniques of communicating in a network environment suffer from deficiencies. For example, as discussed above, the operator of a mobile communication device can manually select amongst different available wireless communication options to communicate with a remote target device. For example, the operator can select between communicating over a cellular phone link (long-range link) or a WiFi™ communication link (short range link) to retrieve data from a corresponding server resource. However, currently, there is no way for an operator of a communication device to benefit from handing off a communication link from a mobile communication device communicating over a cellular phone link to a respective short-range wireless link (such as a WiFi™ base station) when the operator roams within a vicinity of the a subscriber domain in which a WiFi™ base station resides.

Embodiments herein deviate with respect to conventional techniques. For example, in one embodiment, a wireless gateway supplied by a service provider enables a respective subscriber to perform handoffs in a network environment. Note that the wireless gateway and any related functionality as described herein can be or include hardware, software, or a combination of hardware and software to carry out execution.

More specifically, by way of non-limiting example, a subscriber domain in a network environment (such as a cable network environment) can include a wireless gateway. The wireless gateway can be configured to provide access to a shared communication link (such as a physical link in a cable network environment) through a respective portal.

In one embodiment, the wireless gateway monitors the subscriber domain (such as a user's home) for presence of a communication device operated by the subscriber associated with the subscriber domain. If the wireless gateway detects that a subscriber associated with the subscriber domain currently uses the communication device to communicate over a first wireless communication link such as a cellular phone link, the wireless gateway provides a notification to the communication device. The notification can indicate that an alternative type of communication link (such as a link between the wireless gateway hardware and the communication device) may be available to handoff the cellular phone link.

In accordance with further embodiments, the wireless gateway can have access to mapping information that maps a network address of one or more different communication devices operated in a particular subscriber domain to corresponding carrier frequency spectrums assigned for use by the communication devices to communicate using a respective cellular phone link. Based on monitoring a cellular phone carrier frequency spectrum assigned to the respective communication device, the wireless gateway monitors a respective subscriber domain for cell phone communications. Assume that the operator of the communication device subscribes to a cellular phone service that supports communications via a particular cellular phone carrier frequency spectrum. In such an instance, the wireless gateway monitors the particular carrier frequency spectrum to detect presence of the communication device communicating in the subscriber domain.

Mere detection of the particular cellular phone carrier frequency spectrum does not necessarily mean that the wireless gateway hardware has detected presence of a communication device authorized to perform a handoff. Further processing as discussed below ensures that the communication device is authorized to perform a handoff before a respective handoff takes place.

Assume further in this example embodiment that the wireless gateway detects presence of a communication device communicating over the particular carrier frequency spectrum. In other words, assume that the wireless gateway detects that an operator of the communication device currently communicates over a cellular phone link with a cell phone tower. In one non-limiting example embodiment, in response to detecting presence of the active communication device (which may or may not be authorized to perform a handoff), the wireless gateway broadcasts a notification to the communication device indicating its presence. The notification from the wireless gateway to the communication device can include a unique identifier value (such as a name, network address, etc.) assigned to the wireless gateway.

Note that as an alternative to monitoring the subscriber domain for communications within a particular frequency spectrum assigned to users in the subscriber domain, embodiments herein can include configuring the wireless gateway to repeatedly or occasionally broadcast a wireless probe in the subscriber domain to notify any communication devices of the presence of the wireless gateway. The wireless probe generated by the wireless gateway hardware can include the unique identifier value assigned to the wireless gateway hardware. A communication device can be configured to continuously monitor a respective region for presence of the wireless gateway.

Establishment of a second wireless communication link to perform a handoff can be contingent, at least in part, upon the unique identifier value received from the wireless gateway. For example, in one embodiment, the communication device can be configured to pre-store a unique identifier value assigned to the wireless gateway disposed in the subscriber domain. In other words, prior to using the communication device to communicate over the first wireless communication link, the communication device can be configured to store the unique identifier value assigned to the wireless gateway hardware. Thus, subsequent to establishing and communicating over a first wireless communication link (such as a cellular phone link), the communication device can be configured to receive a notification from the wireless gateway indicating that the wireless gateway is in a vicinity of the communication device and is available for communications. In one embodiment, the communication device initiates a handoff of a communication session from the communication device to the wireless gateway hardware depending on a unique identifier value received from the wireless gateway. That is, if the unique identifier value received from the wireless gateway matches the pre-stored unique identifier value, the communication device can be configured to further communicate with the wireless gateway to establish the second wireless communication link to perform a respective handoff of a communication session.

Pre-storage of the unique identifier value assigned to the wireless gateway hardware ensures that the communication device only attempts to perform handoffs using only authorized wireless gateways as pre-specified by a respective operator of the communication device.

In one embodiment, in furtherance of establishing the second wireless communication link between the communication device and the wireless gateway hardware, the communication device can be configured to transmit a request to establish the second wireless communication link. The request transmitted from the communication device to the wireless gateway can include a network address assigned to the communication device. Thus, during establishment of the second wireless communication link, the wireless gateway can be configured to receive a network address transmitted from the communication device to the wireless gateway. In one embodiment, the network address (such as MAC address, IP address, etc.) is a unique identifier value assigned to the communication device, enabling retrieval of data over the first wireless communication link.

The wireless gateway hardware can be configured to verify that the communication device is authorized to perform a handoff to the wireless gateway hardware prior to a respective handoff. For example, prior to receiving the network address, the wireless gateway compares the received network address of the communication device to a listing of network addresses of corresponding communication devices that are authorized to perform a respective handoff of a communication link to the wireless gateway. Via the comparing operation, assume that the wireless gateway verifies that the network address assigned to the communication device is included in a pre-stored group of communication devices that are authorized to perform a handoff of a respective communication session to the wireless gateway.

Thus, in one embodiment, to prevent improper handoffs to the wireless gateway hardware, prior to the occurrence of a respective handoff, the wireless gateway can verify that the network address of the communication device is included in a group of communication devices that are authorized to perform a handoff of a respective communication link to the wireless gateway.

In furtherance of performing the handoff, the wireless gateway hardware can be configured to receive network session information over the second wireless communication link from the communication device. In one embodiment, the network session information indicates a state or attributes of the communication device retrieving first data from a remote resource over the first wireless communication link (such as a wireless cellular phone link). The wireless gateway utilizes the network session information received from the communication device to retrieve second data over the shared communication link from the remote resource. In one embodiment, the second data received over the shared communication link is a substantial duplicate of the first data retrieved by the communication device over the first wireless communication link.

The wireless gateway communicates over the second wireless communication link to the communication device to notify the communication device of a status of the wireless gateway retrieving the second data over the shared communication link. Eventually, the wireless gateway retrieves the same data from the remote source that an application executing in the communication device retrieves from the remote source. At such time, in response to detecting that the communication device can receive the same data over the second wireless communication link instead of the first wireless communication link, the wireless gateway and/or communication device initiates termination of the first wireless communication link in favor of using the second wireless communication link to retrieve requested data. In other words, in one embodiment, the communication device terminates the first wireless communication link and uses the second wireless communication link with the wireless gateway to receive requested content. This constitutes a handoff of the communication session from the wireless cellular phone link to the wireless gateway.

Transition to the second wireless communication link with the wireless gateway can provide continued and uninterrupted data retrieval. For example, the wireless gateway can be configured to continue requesting retrieval of content over the second wireless communication link from the communication device. On behalf of the communication device, the wireless gateway retrieves the requested content over the shared communication link and transmits the requested content over the second wireless communication link to the communication device.

As noted above, embodiments herein can facilitate wireless communication link handoffs amongst networks managed by different service providers. For example, in one embodiment, assume that the operator of the communication device subscribes to use of the wireless cellular phone link in accordance with an agreement with a first communication service provider (such as a cell phone service provider). Assume further that the operator of the mobile communication device also subscribes to a cable network service and use of the wireless gateway and shared communication link in accordance with an agreement with a second communication service provider (such as a cable network service provider). The first communication service provider may operate independently of the second communication service provider. However, embodiments herein enable substantially seamless handoffs amongst networks managed by different service providers.

In accordance with yet further embodiments, note that the decision to perform a respective handoff can depend on the ability of the shared communication link to support appropriate data throughput. For example, in one embodiment, the wireless gateway can be configured to receive bandwidth requirement information from the communication device over the second wireless communication link. The bandwidth requirement information can indicate a bandwidth needed to support a current communication session over the first wireless communication link between the communication device and a remote server resource. Prior to the handoff, the wireless gateway can be configured to verify an ability of the second wireless communication link and the shared communication link to support the bandwidth needed to communicate with the remote server resource over the shared communication link. In one embodiment, in response to detecting that the second wireless communication link and the shared communication link have the ability to support the communication session, the wireless gateway and/or communication device initiates a handoff of the communication session to the wireless gateway hardware.

Note further that the wireless gateway as described herein can reside in a first subscriber domain of multiple subscriber domains in a respective service group. Each of the multiple subscriber domains can be communicatively coupled to the shared communication link. Each of the subscriber domains can subscribe to use of respective data link resources (supporting IP traffic) in the shared communication link to receive Internet communications in a home environment. In such an instance, each of the subscriber domains is able to retrieve Internet data. In one embodiment, a cable service provider allocates or dedicates a portion of bandwidth of the shared communication link (as a separate portion of bandwidth from bandwidth allocated to support a subscriber's data plan into their home) to support handoffs from communication devices in the multiple subscriber domains. Allocation of the separate bandwidth in the shared physical communication link (or alternatively dynamically increasing a bandwidth for transmitting data packets between the wireless gateway and a respective cable modem termination system) to support handoffs ensures that a guaranteed bandwidth is available and that a handed off link does not experience congestion.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by computer processor hardware (such as in wireless gateway hardware), cause the computer processor hardware of the system to: detect presence of a communication device communicating over a first wireless communication link, the first wireless communication link being a wireless cellular phone link; in response to detecting the communication device, provide notification of the wireless gateway hardware to the communication device; and establish a second wireless communication link, the second wireless communication link established between the communication device and the wireless gateway hardware.

Another embodiments herein includes a computer readable storage medium and/or system having instructions stored thereon. The instructions, when executed by computer processor hardware (such as in wireless gateway hardware), cause the computer processor hardware of the system to: pre-store a unique identifier value assigned to wireless gateway hardware disposed in a subscriber domain assigned of an operator of the mobile communication device; subsequent to establishing the first wireless communication link, receive a communication indicating that the wireless gateway hardware is in a vicinity of the mobile communication device; and initiate a handoff of a communication session from the communication device to the wireless gateway hardware depending on a unique identifier value received from the wireless gateway hardware.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for implementing a wireless gateway configured to provide different levels of network access to users in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 2 is an example diagram illustrating mapping information associated with a wireless gateway according to embodiments herein.

Figure 1:
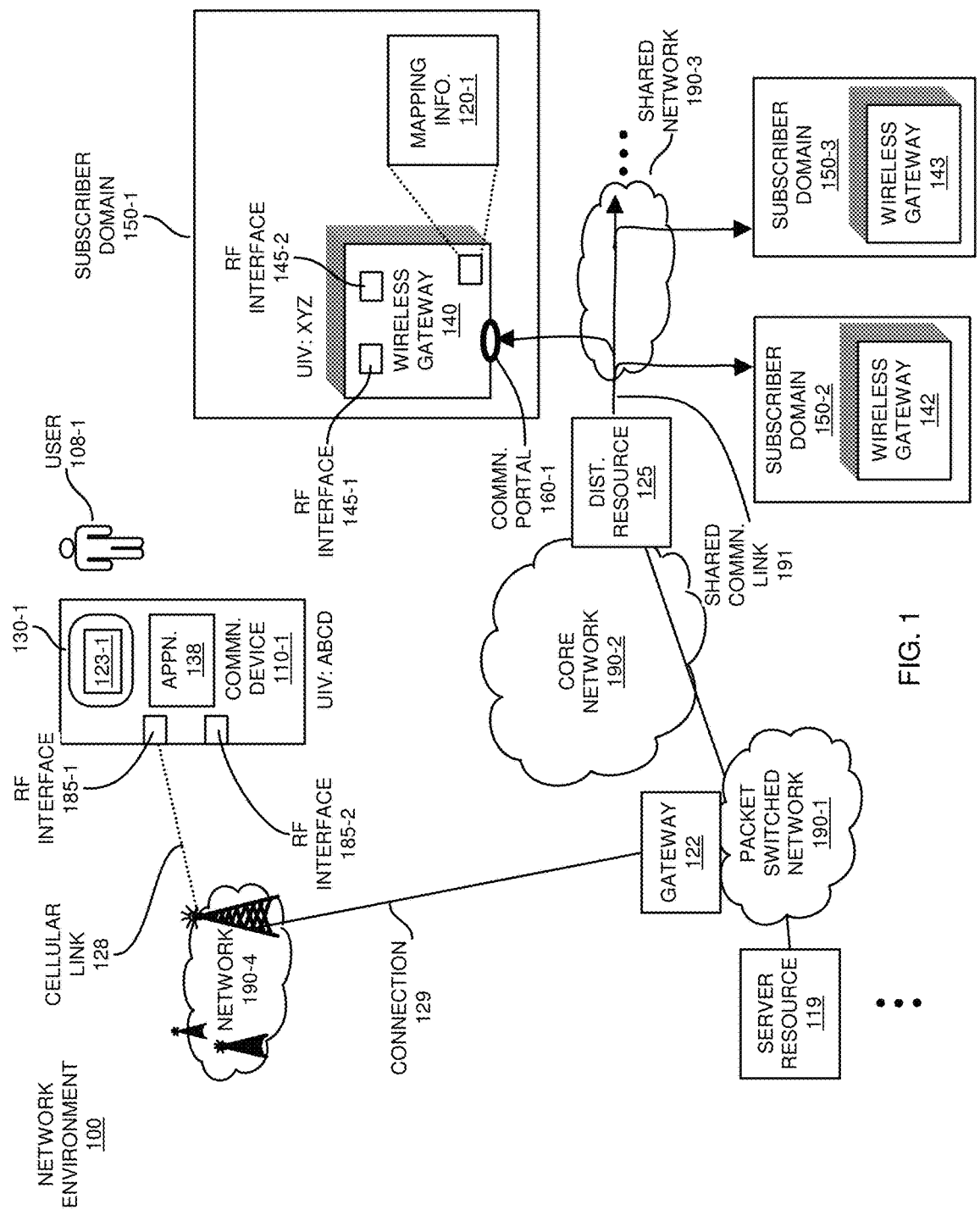
FIG. 1 is an example diagram illustrating a state of a network environment and wireless gateway prior to handoff of a wireless communication link according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In general, as described herein, a wireless gateway disposed in a subscriber domain detects presence of a communication device communicating in a vicinity of the subscriber domain over a first wireless communication link such as a wireless cellular phone link. In response to detecting the communication device in the subscriber domain, the wireless gateway provides notification of a presence of the wireless gateway hardware to the communication device. The wireless gateway participates in establishing a second wireless communication link (such as a short range communication link) between the communication device and the wireless gateway to facilitate a handoff of a communication session from the first wireless communication link to the second wireless communication link.

Now, more specifically, FIG. 1 is an example diagram illustrating a wireless gateway according to embodiments herein. Note that the wireless gateway 140 represents hardware, software, or a combination of hardware and software to carry out functionality as discussed herein.

As shown, network environment 100 includes one or more networks 190 such as a packet-switched network 190-1, a core network 190-2, shared network 190-3, cellular phone network 190-4, etc.

Each of the networks 190 can support transmission of digital data such as data packets, MPEG data transport streams, etc. In one embodiment, one or more of networks 190 supports switching of data packets using source and destination address information. The source address of a data packet indicates a corresponding resource from which the data packet is generated. The destination address indicates a corresponding address of the resource to which the data packet is being transmitted. The network 190 uses the destination address to route the respective data packets to an identified destination.

In general, via the different types of networks 190, respective subscribers and corresponding playback devices in subscriber domains 150 are able to retrieve and playback different types of content such as over-the-top content (such as web pages), scheduled broadcast content, video on-demand content, Internet content, etc.

Note that each of the subscriber domains 150 in network environment 100 can be any suitable type of environment such as a home environment, business environment, etc. In one embodiment, subscriber domain 150-1 represents a home environment or residence where a respective user 108-1 domiciles.

In this example embodiment, a user associated with subscriber domain 150-1 operates communication device 110-1. Communication device 110-1 is assigned a unique identifier value (such as a network address) of ABCD. The unique identifier value can be a MAC address, an IP address, etc.

As shown in FIG. 1, user 108-1 and corresponding communication device 110-1 are operated outside of the subscriber domain 150-1. Communication device 110-1 includes a first RF interface 185-1 supporting long-range communications such as cellular phone communications. Communication device 110-1 also includes a second RF interface 185-2 supporting short-range communications such as WiFi™ communications.

As its name suggests, the RF interface 185-1 of cellular phone network 190-4 enables corresponding user 108-1 to communicate with other cell phone devices (via communication over network 190-4 located in the network environment 100. For example, the user 108-1 can dial a specific number into communication device 110-1. The communication device 110-1 utilizes the phone number to establish a wireless communication link 128 between communication device 110-1 and network 190-4.

Additionally, note again that communication device 110-1 includes RF interface 185-2 supporting short-range communications such as WiFi™ communications. In this example embodiment, the communication device 110-1 does not currently use the RF interface 185-2 to communicate with another communication device.

Via communications over wireless communication link 128 and connection 129 to gateway 122, the communication device is able to communicate with one or more server resources in packet-switched network 190-1.

In this non-limiting example embodiment, assume that the user 108-1 executes application 138 such as a browser application on communication device 110-1. Application 138 displays corresponding graphical user interface 123-1 on display screen 130-1 of communication device 110-1. Via application 138, and use of communication link 128, the user 108-1 is able to retrieve data (such as a webpage data) from a resource such as server resource 119.

For example, user 108-1 can input a request (including the destination network address of the server resource 119) to retrieve a webpage from server resource 119. In response to receiving the request, the application 138 communicates the request over communication link 128 through network 190-4 over connection 129 to gateway 122. Gateway 122 forwards the requests for content over packet-switched network 190-1 to server resource 119.

In a reverse direction, the server resource 119 transmits the requested data over packet-switched network 190-1 to gateway 122. Gateway 122 forwards the requested data over connection 129 through network 190-4 over communication link 128 to the application 138 in communication device 110-1. Application 138 then initiates display of the corresponding retrieved web page information on display screen 130-1 in graphical user interface 123-1.

Note that subscriber domain 150-1 includes wireless gateway 140. Wireless gateway 140 provides users present in subscriber domain 150-1 access to one or more networks such as packet-switched network 190-1, core network 190-2, shared network 190-3, etc., via shared communication link 191.

Note that in a similar manner that subscriber domain 150-1 includes wireless gateway 140, each of the other subscribers domains can be configured to include a respective wireless gateway. For example, subscriber domain 150-2 can include a respective wireless gateway 142 to control access to shared communication link 191; subscriber domain 150-3 can include a respective wireless gateway 143 to control access to shared communication link 191; and so on. Each of the wireless gateways 140, 142, 143, etc., perform similar operations, enabling a respective handoffs in network environment 100.

By way of further non-limiting example, a group of subscriber domains 150 communicatively coupled to shared communication link 191 represents a service group in a cable network environment. As shown, shared network 190-3 (including shared communication link 191) supports final connectivity to subscribers or subscriber domains 150 and may include physical media such as one or more coaxial cables, optical fibers, twisted wire pairs, etc., to provide connectivity between distribution resource 125 and the subscriber domains 150.

Shared network 190-3 can include a respective logical connectivity between the distribution resource 125 (such as a cable modem termination system) and each of the respective wireless gateways. In other words, a first logical link in shared communication link 191 supports communications between distribution resource 125 and the wireless gateway 140; a second logical link in shared communication link 191 supports communications between distribution resource 125 and the wireless gateway 143; a third logical link in shared communication link 191 supports communications between distribution resource 125 and the wireless gateway 143; and so on.

By further way of non-limiting example, a service provider associated with shared communication link 191 can allocate a predetermined portion of bandwidth associated with shared communication link to support communications with a respective subscriber domain in network environment 100. Thus, each of the subscriber domains 150 can be assigned use of a portion of bandwidth in the data channels (of shared communication link 191) to communicate data in an upstream or downstream direction. Via use of the data channels, each of the users 108 in respective subscriber domains 150 can retrieve over-the-top content from respective server sources disposed in packet-switched network 190-1 (such as the Internet), core network 190-2, etc.

Note that wireless gateway 140 can be any suitable type of resource such as a set-top box, cable modem, WiFi™ access point, server resource, data router, etc. As previously discussed, wireless gateway 140 includes a combination of hardware and software resources to carry out functionality as discussed herein.

As shown in FIG. 1, the shared communication link can be any suitable type of communication medium such as a physical medium, a wireless medium, etc.

In one embodiment, wireless gateway 140 is a wireless access point controlling network access for each of multiple members in present in subscriber domain 150-1. By further way of a non-limiting example, wireless gateway 140 can be a wireless access point such as a WiFi™ base station coupled to shared communication link 191. As previously discussed, a logical connection between the wireless gateway 140 and the distribution resource 125 supports network communications between resources in subscriber domain 150-1 and resources in packet-switched network 190-1.

The wireless gateway 140 can support communications respective communication devices via any suitable protocol or WiFi™ standards such as IEEE (Institute of Electrical and Electronics Engineers) 802.11a, 802.11b, 802.11g, 802.11n, etc.

In an upstream direction, wireless gateway 140 facilitates forwarding of content from communication devices in subscriber domain 150-1 through communication portal 160-1 over shared communication link 191. In a downstream direction, wireless gateway 140 facilitates distribution of content received over shared communication link 191 to one or more communication devices in subscriber domain 150-1.

If desired, wireless gateway 140 can be configured to support cable modem functionality. Via communications through the wireless gateway 140 and over shared communication link 191 to distribution resource 125 (such as a cable modem termination system), authorized communication devices in subscriber domain 150-1 can communicate with the wireless gateway 140 to initiate retrieval of content such as video on demand content, over-the-top content, broadcast content, IPTV content, webpage content, data packets, etc. Wireless gateway 140 retrieves the requested content on behalf of respective users in subscriber domain 150-1.

Accordingly, wireless gateway 140 can be configured to provide different types of data services such as delivery of different types of content. In more particular embodiments discussed in more detail below, each user or corresponding communication device must be first authenticated for the device to be allowed use of wireless gateway 140 to retrieve or transmit data over shared communication link 191.

Wireless gateway 140 can receive broadcast content from one or more resources in core network 190-2. The broadcast content can be transmitted over predetermined broadcast channels in shared communication link 191 to the multiple subscriber domains 150. To play back broadcast content, the wireless gateway 140 can be configured to tune to one or more channels as indicated by users of respective communication devices.

As discussed above, in addition to or as an alternative to conveying broadcast content, as mentioned, the shared communication link 191 can be configured to support distribution of so-called over-the-top content. For example, a portion of bandwidth in shared communication link 191 can be allocated to support data channels in accordance with DOCSIS (Data Over Cable Service Interface Specification) or any other suitable communication standard supporting bi-directional communications over shared communication link 191.

Wireless gateway 140 includes communication portal 160-1 (such as one or more channels, cables, links, etc.) facilitating access to shared communication link 191 and one or more shared networks 190.

In one embodiment, the wireless gateway 140 monitors the subscriber domain 150-1 for presence of one or more pre-specified communication device operated by one or more operators in subscriber domain 150-1. If the wireless gateway 140 detects that a user associated with the subscriber domain 150-1 currently uses the communication device 110-1 to communicate over a first wireless communication link 128 such as a cellular phone link, the wireless gateway 140 provides a notification to the communication device 110-1. The notification can indicate that an alternative type of communication link is available to handoff the cellular phone link.

More specifically, in one embodiment, wireless gateway 140 has access to mapping information 120-1. FIG. 2 is an example diagram illustrating mapping information 120-1 according to embodiments herein. In this example embodiment, mapping information 120-1 associated with wireless gateway 140 indicates the different mobile communication devices that are authorized to perform handoffs to the wireless gateway 140-1 when present in the subscriber domain 150-1.

For example, as specified by the mapping information 120-1, the first member of a household associated with the subscriber domain 150-1 can operate a corresponding first mobile communication device assigned a unique identifier value (UIV=Unique Identifier Value) such as a MAC address of ABCD; a second member of a household associated with the subscriber domain 150-1 can operate a second mobile communication device assigned a unique identifier value (or UIV such as a MAC address) of AB34; and so on. In this manner, the mapping information 120-1 can keep track of the unique addresses of communication devices associated with users in subscriber domain 150-1.

In one embodiment, one or more users in the subscriber domain 150-1 produce the mapping information 120-1 by inputting the unique identifier value assigned to each respective communication device. Thus, a respective subscriber can initiate creation of mapping information 120-1 indicating the different users that are authorized to perform handoffs in subscriber domain 150-1.

In addition to providing the unique identifier value information, the users in subscriber domain can specify a particular service provider that supports cell phone communications with the specified communication device. In this example embodiment, the mapping information 120-1 indicates that the user of the mobile communication device 110-1 (assigned a unique identifier value of ABCD) subscribes to cell phone service provider company A (such as Verizon); the user of a mobile communication device (assigned a unique identifier value of AB34) subscribes to cell phone service provider company B (such as Verizon); and so on.

It is known which carrier frequency spectrum is used by a respective cell phone service provider to provide communications to a corresponding mobile communication device. In this example embodiment, assume that company A supports wireless cellular phone communications in the 700 MHz and 1800 MHz spectrum; assume that company B supports wireless cellular phone communications in the 2.5 GHz spectrum; and so on.

Referring again to FIG. 1, via mapping information 120-1 assigned to wireless gateway 140, the wireless gateway 140 maps a network address of each communication device potentially operated in subscriber domain 150-1 to a corresponding carrier frequency spectrum assigned for use by the communication device to communicate using a respective cellular phone link. In one embodiment, the mapping information 120-1 indicates network addresses of respective mobile communication devices in which it is permissible to perform a handoff of a respective communication link to the wireless gateway 140 as further discussed below.

The wireless gateway 140 accesses mapping information 120-1 and monitors the carrier frequency spectrums (such as 700 MHz/1800 MHz, 2.5 GHz, . . . ) assigned to mobile communication device 110-1, 110-2, etc. For example, via the RF interface 145-1 and 145-2, the wireless gateway 140 monitors the subscriber domain 150-1 to detect communications in the identified carrier frequency spectrums (such as 700 MHz/1800 MHz, 2.5 GHz, . . . ) associated with authorized communication devices 110-1 and 110-2.

In one embodiment, monitoring one or more cellular phone carrier frequency spectrums assigned to the respective communication devices associated with subscriber domain 150-1 is tantamount to monitoring the subscriber domain 150-1 for cell phone communications.

As mentioned, the operator of the communication device 110-1 subscribes to a cellular phone service company A that supports communications via a particular cellular phone carrier frequency spectrum (700 MHz/1800 MHz). In accordance with the mapping information 120-1, the wireless gateway 140 monitors subscriber domain 150-1 for wireless communications in the particular carrier frequency spectrum (700 MHz/1800 MHz) to detect presence of the communication device 110-1 communicating in the subscriber domain 150-1.

As shown in FIG. 1, the user 108-1 and corresponding communication device 110-1 reside outside of subscriber domain 150-1. In such an instance, because the communication device 110-1 is out of range with respect to wireless gateway 140, the RF interface 145-1 and 145-2 does not detect presence of the communication device 110-1 communicating in subscriber domain 150-1.

Figure 3:
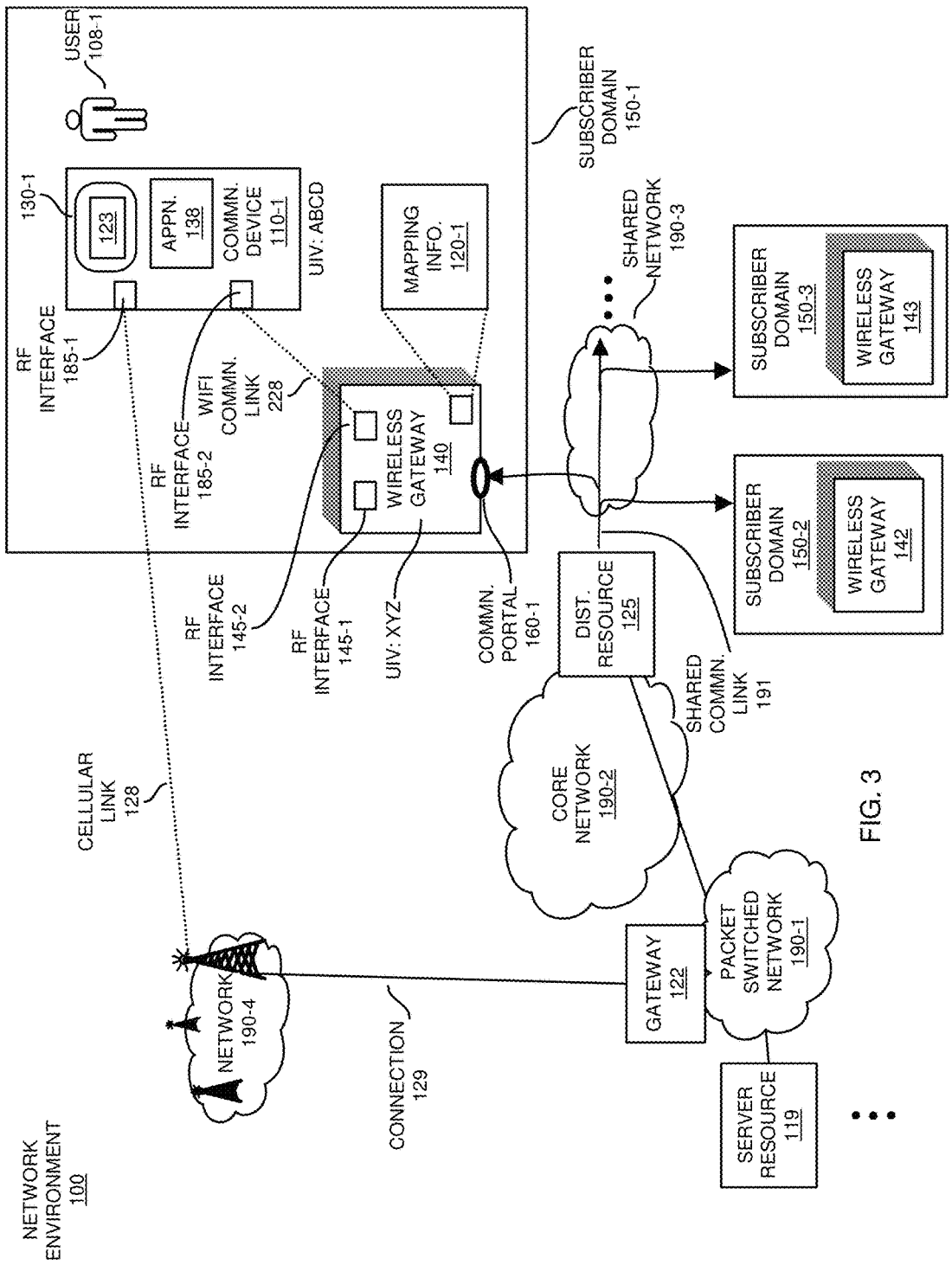
FIG. 3 is an example diagram illustrating a state of a network environment and wireless gateway during a handoff of a wireless communication link according to embodiments herein.

Assume that, while communication link 128 is actively used to retrieve data, the user 108-1 operating communication device 110-1 roams about network environment 100 into subscriber domain 150-1 as shown in FIG. 3. As previously discussed, the wireless gateway 140 continues to monitor for presence of the particular carrier frequency spectrum assigned to communication device 110-1.

Because the communication device 110-1 currently communicates over communication link 128-1 in the monitored carrier frequency spectrum associated with company A, the wireless gateway 140-1 detects presence of communication device 110-1 communicating over the particular carrier frequency spectrum. In other words, assume that the wireless gateway 140 detects that the user 108-1 (operator) of the communication device 110-1 currently communicates over wireless communication link 128 (which is in the carrier frequency spectrum monitored by the RF interface 145-1and 145-2) with a respective cell phone tower in cellular network 190-4. In response to detecting presence of the actively communicating communication device 110, the wireless gateway 140 broadcasts a wireless notification from RF interface 145-1 and 145-2 in the subscriber domain 150-1 to any listening communication devices in subscriber domain 150-1.

In one embodiment, the wireless gateway 140 broadcasts the notification as a wireless probe in accordance with the WiFi™ protocol. The broadcasted probe (notification) notifies any listening devices of a presence of the wireless gateway 140 in the subscriber domain 150-1.

In accordance with further embodiments, the wireless notification broadcasted in the subscriber domain 150-1 can include a unique identifier value (XYZ) assigned to the wireless gateway 140. The unique identifier value assigned to the wireless gateway 140 can be any suitable value such as a unique name assigned to the wireless gateway 140-1, a unique network address assigned to the wireless gateway 140, and so on.

Note that as an alternative to monitoring the subscriber domain for communications within a particular frequency spectrum and generating a corresponding notification when a respective communication is detected, embodiments herein can include configuring the wireless gateway 140 to repeatedly or occasionally broadcast a wireless probe signal in the subscriber domain 150-1 (regardless of whether communications are detected on a particular wireless carrier frequency spectrum) to notify any communication devices of the presence of the wireless gateway 140 in the subscriber domain 150-1. As mentioned, a respective communication device in the subscriber domain 150-1 can be configured to continuously monitor a respective region for presence of the wireless gateway 140.

As previously discussed, the communication device 110-1 includes RF interface 185-1, which supports long-range communications, to establish communication link 128 and communicate over network 190-4 to gateway 122. Additionally, communication device 110-1 includes RF interface 185-2 and 185-1 supporting short-range communications such as WiFi™ communications.

Assume in this example embodiment that a user of the communication device 110-1 has configured the application 138 to be amenable to a handoff a respective communication session to the wireless gateway 140 if possible. In one embodiment, the user 108-1 can provide configuration settings indicating to the application 138 that it is to automatically initiate a handoff with a respective wireless gateway 140 if the wireless gateway 140 happens to be in a vicinity of the communication device 110-1 while the user 108-1 uses the application 138 to communicate over communication link 128 and retrieve data from a remote server resource.

In accordance with further embodiments, as an alternative to automatically initiating the handoff, in response to detecting presence of the wireless gateway 140, the application 138 in communication device 110-1 can initiate display of corresponding message on display screen 130-1 requesting the user 108-1 to provide input indicating whether to perform a respective handoff. In situations where security is an issue, the user 108-1 operating communication device 110-1 can be required to provide appropriate input such as an appropriate password in order for the wireless gateway 140 to go forward with a respective handoff.

Handoff of a respective communication session requires establishing a new wireless communication link between the communication device 110-1 and the wireless gateway 140. As further described herein, subsequent to a respective handoff, the application 138 continues a respective communication session as initiated by a respective user 108-1 over the new wireless communication link (such as communication link 228) instead of over communication link 128.

Establishment of a new wireless communication link (such as communication link 228) to perform a handoff can be contingent, at least in part, upon the unique identifier value received from the wireless gateway 140. For example, as previously discussed, in furtherance of a initiating a possible future handoff, the application 138 can be configured to monitor a presence of wireless communications received over RF interface 145-2 and 145-1 during conditions such as when the communication device 110-1 executes application 138 to retrieve data over an activated cell phone link. Configuration settings of the communication device 110-1 can indicate to perform a handoff to the wireless gateway 140 if possible.

In one embodiment, user 108-1 can configure the communication device 110-1 to pre-store a unique identifier value (XYZ) assigned to the wireless gateway 140 disposed in the subscriber domain 150-1. Thus, subsequent to establishing and communicating over a first wireless communication link 128 (such as a cellular phone link), the communication device 110-1 can be configured to receive the broadcasted notification from the wireless gateway 140 indicating that the wireless gateway resides within a vicinity of the communication device 110-1 and is available for handoff of communications.

The communication device 110-1 can be configured to initiate a handoff of a communication session from the communication device to the wireless gateway 140 depending on a unique identifier value received from the wireless gateway 140. That is, if the unique identifier value (such as unique identifier value XYZ) received from the wireless gateway 140 matches the pre-stored unique identifier value (XYZ), the communication device 110-1 further communicates with the wireless gateway 140 over RF interface 185-2 and 185-1 to establish the wireless communication link 228 to perform a respective handoff of a communication session associated with application 138 to the wireless gateway 140.

In one embodiment, in furtherance of automatically establishing a wireless communication link to perform a handoff because wireless gateway 140 was detected as being available, the communication device 110-1 transmits a request from RF interface 185-1 and 185-2 to the wireless gateway 140 to establish the wireless communication link 228.

The request (such as an association message) transmitted from the communication device 110-1 to the wireless gateway 140 can include a network address (such as unique identifier value ABCD) assigned to the communication device 110-1. Thus, during association and establishment of the second wireless communication link 228, the wireless gateway 140 receives a network address of the communication device 110-1.

In one embodiment, the unique identifier value ABCD (such as a network address) is a unique identifier value assigned to the communication device 110-1, enabling retrieval of data over the first wireless communication link 128. In other words, the application 138 supporting communications with server resource 119 uses the unique identifier value such as ABCD as a source address for data packets transmitted form communication device 110-1 to server resource 119 over wireless communication link 128.

In yet further embodiments, subsequent to receiving the unique identifier value ABCD assigned to communication device 110-1, the wireless gateway 140 compares the received network address ABCD received from the communication device 110-1 to a listing of network addresses in mapping information 120-1. Mapping information 120-1 indicates that mobile communication device (assigned unique identifier value ABCD), mobile communication device 110-2 (unique identifier value AB34), etc., are authorized to perform a respective handoff of a communication link or communication session to the wireless gateway 140.

During the operation of comparing the received unique identifier value associated with the communication device 110-1 and the unique identifier values in mapping information 120-1, assume that the wireless gateway 140 verifies that the network address provided by the communication device 110-1 happens to be included in the pre-stored list of communication devices (as specified by mapping information 120-1) that are authorized to perform a handoff of a respective communication session to the wireless gateway 140. In one embodiment, this verification prevents improper handoffs to unauthorized communication devices. That is, to prevent improper handoffs, prior to the occurrence of the handoff, the wireless gateway 140 verifies that the unique identifier value of the communication device requesting the handoff is included in a group of communication devices that are authorized to perform a handoff of a respective communication link to the wireless gateway 140.

Because the unique identifier value associated with the communication device 110-1 is pre-stored in the mapping information 120-1, the communication device 110-1 is pre-authenticated to perform a respective handoff. For example, in contrast to conventional techniques in which a respective wireless gateway must authenticate a communication device and its network address by communicating with one or more authentication servers over a respective network, the pre-authentication as described herein (such as storing the unique identifier value of the communication device 110-1 in the mapping information 120-1) enables the respective wireless gateway 140 to more quickly establish the wireless communication 228 and use of shared communication link 191 on behalf of the communication device 110-1.

Association of the communication device 110-1 to the wireless gateway 140 can include further communications. For example, further communications during association of the communication device 110-1 to the wireless gateway 140 can include agreement between the communication device 110-1 in wireless gateway 140 of the communication parameters (e.g., data rate, security, etc.) to establish a respective wireless communication link 228. Thus, in one embodiment, association sets the stage to support future communications between a communication device 110-1 and the respective wireless gateway (wireless access point).

Assuming that the association is successful in establishing the wireless communication link 228, the communication device 110-1 is now able to transmit and receive data over established wireless communication link 228. In one embodiment, as mentioned above, the communication device executes application 138 and retrieves data through the wireless gateway 140 via use of HTTP (Hypertext Transfer Protocol) or any other suitable communication protocol.

In furtherance of performing the handoff, and after verifying that the communication device 110-1 and/or wireless gateway 140 are authorized to perform a handoff, the wireless gateway 140 communicates over the wireless communication link 228 to receive network session information associated with communications over communication link 128. In one embodiment, the network session information indicates a state or attributes of the communication device 110-1 retrieving data from a remote server resource 119 over the first wireless communication link 128 (such as a wireless cellular phone link). In one embodiment, the network session information includes information such as one or more URLs (Uniform Resource Locators) that are used by the application 138 to retrieve corresponding data from one or more server resources in packet-switched network 190-1.

In accordance with further embodiments, session information transmitted from communication device 110-1 to the wireless gateway 140 can include information such as the type of content retrieved by the application 138 over wireless communication link 128; a rate at which the content is retrieved by application 138 over communication link 128; etc.

The wireless gateway 140 utilizes the network session information received from the application 138 of the communication device 110-1 to retrieve data over the shared communication link 191 from the one or more remote resources in packet-switched network 190-1. In one embodiment, the data retrieved over the shared communication link 191 is a substantial duplicate of the data retrieved by the application 138 over the wireless communication link 128.

In one embodiment, as previously discussed, the wireless gateway 140 receives a network address assigned to communication device 110-1. The wireless gateway 140 can be configured to serve as a proxy to retrieve requested data on behalf of the communication device 110-1. To do so, the wireless gateway 140 can obtain a new network address in which to retrieve data on behalf of the communication device 110-1. The wireless gateway tracks that the new network address maps to the network address of communication device 110-1.

To retrieve data on behalf of the communication device 110-1, the wireless gateway 140 communicates through communication portal 160-1 over shared communication link 191 to distribution resource 125 (such as a cable modem termination system). The distribution resource 125 forwards the data packets over packet-switched network 190-1 to respective one or more destination server resources. The one or more server resources respond by forwarding the requested data to distribution resource 125. Distribution resource (such as a cable modem termination system), in turn, forwards the requested data over an appropriate logical link in shared communication link 191 to wireless gateway 140. As data is received and becomes available, the wireless gateway 140 forwards the retrieved data over a corresponding communication link 228 associated with the network address assigned to communication device 110-1.

In accordance with further embodiments, prior to a respective handoff, the wireless gateway 140 communicates over the second wireless communication link 228 to the communication device 110-1 to notify the communication device 110-1 of a status of the wireless gateway 140 retrieving requested data over the shared communication link 191 on behalf of the communication device 110-1. Eventually, the wireless gateway 140 retrieves the same data (or substantially the same data) from the remote source that application 138 executing in the communication device 110-1 retrieves from the remote source over cellular link 128. At such time, in response to detecting that the communication device 110-1 can receive the same data over the second wireless communication link 228, the wireless gateway 140 and/or communication device 110-1 initiates termination of the first wireless cellular link 128 in favor of using the second wireless communication link 228 to retrieve requested data.

Figure 4:
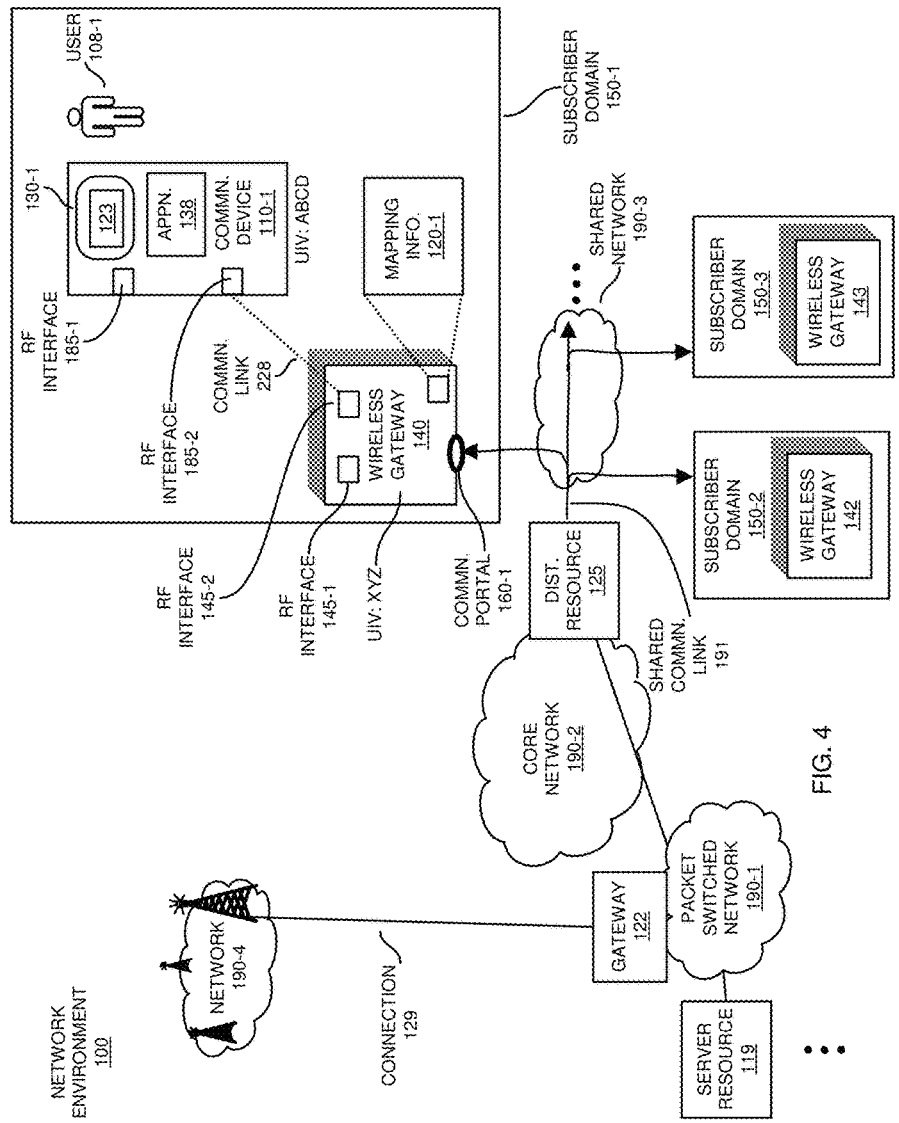
FIG. 4 is an example diagram illustrating a state of a network environment and wireless gateway subsequent to handoff of a wireless communication link according to embodiments herein.

In other words, in one embodiment, in furtherance of performing a respective handoff as further shown in FIG. 4, the communication device 110-1 terminates the first wireless cellular link 128 and uses the second wireless communication link 228 to the wireless gateway 140 to receive the requested content. This constitutes a handoff of a respective communication session from being transmitted over wireless cellular link 128 (such as wireless cellular phone link) to being transmitted over the wireless communication link 228 (such as a WiFi™ communication link).

Transition to use of the wireless communication link 228 between the communication device 110-1 and the wireless gateway 140 can provide the application 138 continued and uninterrupted data retrieval. For example, the wireless gateway 140 can be configured to continue requesting retrieval of content over the second wireless communication link 228 from the communication device 110-1. As previously discussed, on behalf of the communication device 110-1, the wireless gateway 140 retrieves the requested content over the shared communication link 191 and transmits the requested content over the second wireless communication link 228 to the application 138 in communication device 110-1.

As noted, embodiments herein facilitate handoffs amongst networks managed by different service providers. For example, assume that the operator of the communication device 110-1 subscribes to use of the wireless cellular phone link in accordance with an agreement with a first communication service provider (company A that provides a cell phone service). Assume further that the operator of the mobile communication device 110-1 subscribes to a cable network service and use of the wireless gateway 140 and shared communication link 191 in accordance with an agreement with a second communication service provider (such as a cable network service provider). The cell phone service provider may operate independently of the cable network service provider. However, embodiments herein enable substantially seamless handoffs amongst networks managed by different service providers.

In accordance with yet further embodiments, note that the decision to perform a respective handoff can depend on the ability of the shared communication link 191 to support appropriate data throughput on behalf of the communication device 110-1.

For example, in one embodiment, prior to performing a handoff, the wireless gateway 140 can be configured to receive bandwidth information from the communication device 110-1 over the wireless communication link 228. The bandwidth information can indicate a bandwidth needed to support a current communication session occurring over the cellular link 128 (communication link) between the communication device 110-1 and one or more remote server resources.

By way of non-limiting example, prior to the handoff, the communication device 110-1 verifies that the application 138 is authorized by the user 108-1 to request a handoff. Additionally, the wireless gateway 140 verifies that the communication device 110-1 is authorized to go forward with a respective handoff.

Yet further, prior to a respective handoff, the wireless gateway 140 can be configured to verify an ability of the wireless communication link 228 and/or the shared communication link 191 to support the bandwidth needed to communicate with one or more remote server resources over the shared communication link. More specifically, the application 138 may require a downlink bandwidth of 5 MB per second and an uplink bandwidth of 2 MB per second to sustain a handoff of the communication session over wireless cellular link 128. In response to detecting that the second wireless communication link and the shared communication link have the ability to support the communication session and at least a downlink bandwidth of 5 MB per second and an uplink bandwidth of 2 MB per second, the wireless gateway 140 and/or communication device 110-1 enable initiating of a handoff of the communication session to the wireless gateway 140. Alternatively, if an appropriate bandwidth is not available, a respective subscriber may not handoff to a lower quality communication link just because they happen to be in a vicinity of the wireless gateway 140.

As mentioned, the wireless gateway 140 as described herein resides in subscriber domain 150-1. Each of the multiple subscriber domains 150-2, 150-3, etc., (such as members of a respective service group) can be communicatively coupled to the shared communication link 191. Each of the subscriber domains can subscribe to use of a respective data link in the shared communication link to receive Internet communications in a respective subscriber domain such as a home environment. In such an instance, each of the subscriber domains is able to retrieve Internet data over an allotted bandwidth associated with a purchased data plan.

In one embodiment, a service provider of the shared communication link 191 can allocate or dedicate an additional, separate portion of bandwidth of the shared communication link (such as extra logic flows between the distribution resource 125 and wireless gateway 140, which are separate from bandwidth allocated to support a subscriber's data plan into their home as discussed above) to support handoffs associated with communication devices in the multiple subscriber domains. Provisioning of the extra logical flows (for extra bandwidth over shared communication link 191) ensures a guaranteed bandwidth to allow for handoffs and that the handed off links do not experience congestion. Thus, embodiments herein can include dynamically increasing a bandwidth allocated for use by the wireless gateway 140 to communicate over the shared communication link to the distribution resource 125 to facilitate a respective handoff. In one embodiment, in furtherance of performing a respective handoff, the wireless gateway 140 communicates with the distribution resource 125 for allocation of one or more extra data channels or flows to handle the new data traffic associated with the handoff.

At some point, the user 108-1 operating the communication device 110-1 terminates the respective wireless communication link 228. In such an instance, in response to detecting termination of the communication link 228, the wireless gateway 140 communicates with the distribution resource 125 to de-allocate the data channels that were used to support the handoff.

If desired, the separate dynamically allocated bandwidth in shared communication link 191 specifically available for supporting handoffs can be purchased by a respective subscriber or cell phone service provider to ensure that handoffs to a new wireless communication link such as wireless communication link 228 do not result in a lower quality communication link (e.g., lower bandwidth) with respect original wireless communication link 128.

Figure 5:
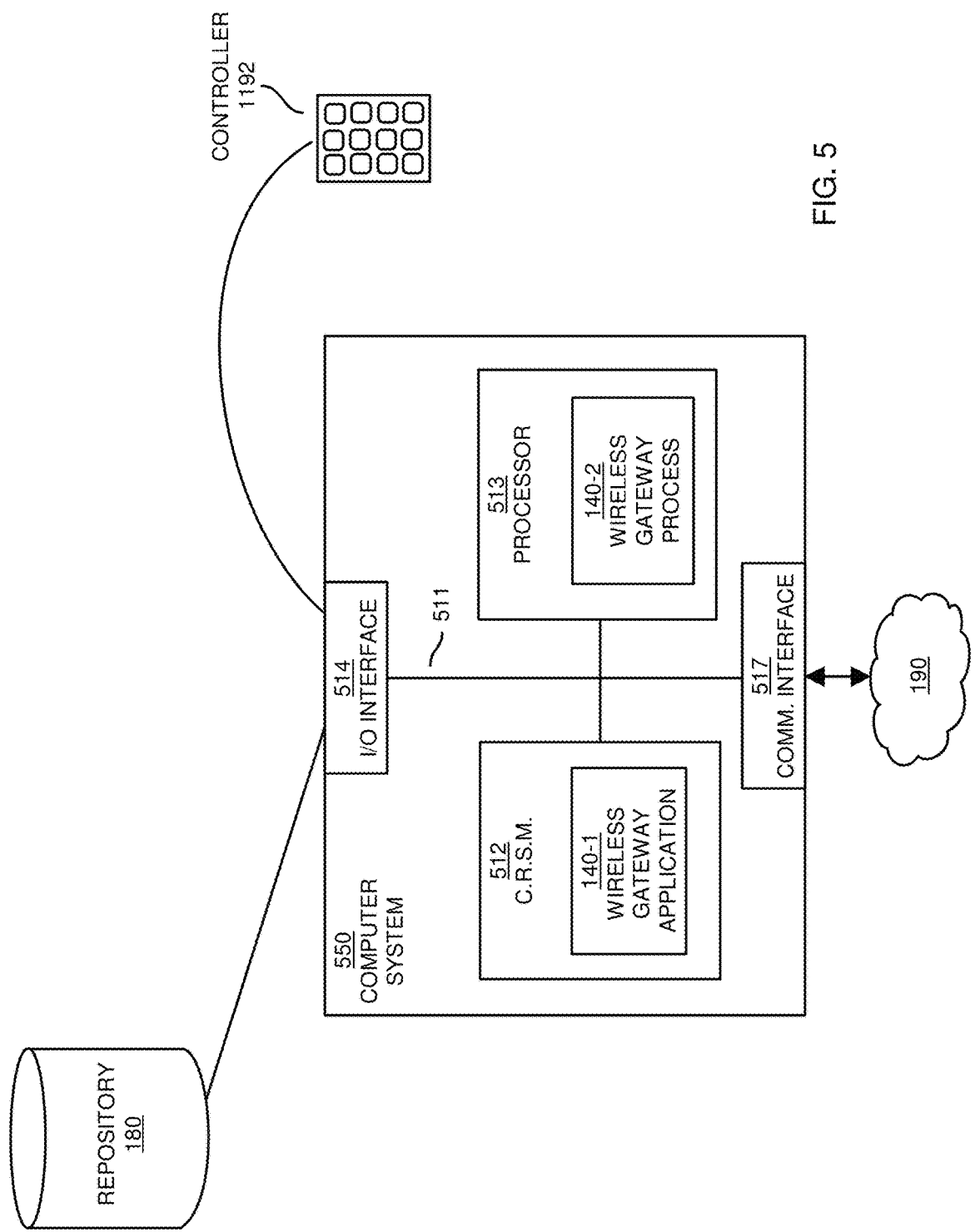
FIG. 5 is a diagram illustrating an example computer architecture in which to execute any of the functionality according to embodiments herein.

FIG. 5 is a diagram illustrating an example computer architecture in which to execute any of the functionality according to embodiments herein. Any of the different processing techniques can be implemented via execution of software code on computer processor hardware.

For example, as shown, computer system 550 (e.g., computer processor hardware) of the present example can include an interconnect 511 that couples computer readable storage media 512 such as a non-transitory type of media (i.e., any type of hardware storage medium) in which digital information can be stored and retrieved. The computer system 550 can further include processor 513 (i.e., computer processor hardware such as one or more processor co-located or disparately located processor devices), I/O interface 514, communications interface 517, etc.

Computer processor hardware (i.e., processor 513) can be located in a single location (such as in wireless gateway 140) or can be distributed amongst multiple locations.

As its name suggests, I/O interface 514 provides connectivity to resources such as repository 180, control devices (such as controller 1192), one or more display screens, etc.

Computer readable storage medium 512 can be any hardware storage device to store data such as memory, optical storage, hard drive, floppy disk, etc. In one embodiment, the computer readable storage medium 512 stores instructions and/or data.

Communications interface 517 (such as communication portal 160-1) enables the computer system 550 and processor resource 513 to communicate over a resource such as any of networks 190. I/O interface 514 enables processor resource 513 to access data from a local or remote location, control a respective display screen, receive input, etc.

As shown, computer readable storage media 512 can be encoded with wireless gateway application 140-1 (e.g., software, firmware, etc.) executed by processor 513. Wireless gateway application 140-1 can be configured to include instructions to implement any of the operations as discussed herein associated with wireless gateway 140.

During operation of one embodiment, processor 513 accesses computer readable storage media 512 via the use of interconnect 511 in order to launch, run, execute, interpret or otherwise perform the instructions in wireless gateway application 140-1 stored on computer readable storage medium 512.

Execution of the wireless gateway application 140-1 produces processing functionality such as wireless gateway process 140-2 in processor resource 513. In other words, the wireless gateway process 140-2 associated with processor resource 513 represents one or more aspects of executing wireless gateway application 140-1 within or upon the processor resource 513 in the computer system 550.

Those skilled in the art will understand that the computer system 550 can include other processes and/or software and hardware components, such as an operating system that controls allocation and use of hardware resources to execute wireless gateway application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 550 may reside at any location or multiple locations in network environment 100. The computer system 550 can be included in any suitable resource in network environment 100 to implement functionality as discussed herein.

Note that each of the other functions as discussed herein can be executed in a respective computer system based on execution of corresponding instructions. For example, communication device 110-1 can include respective computer readable storage medium and processor hardware to execute the operations performed by communication device 110-1.

Figure 6:
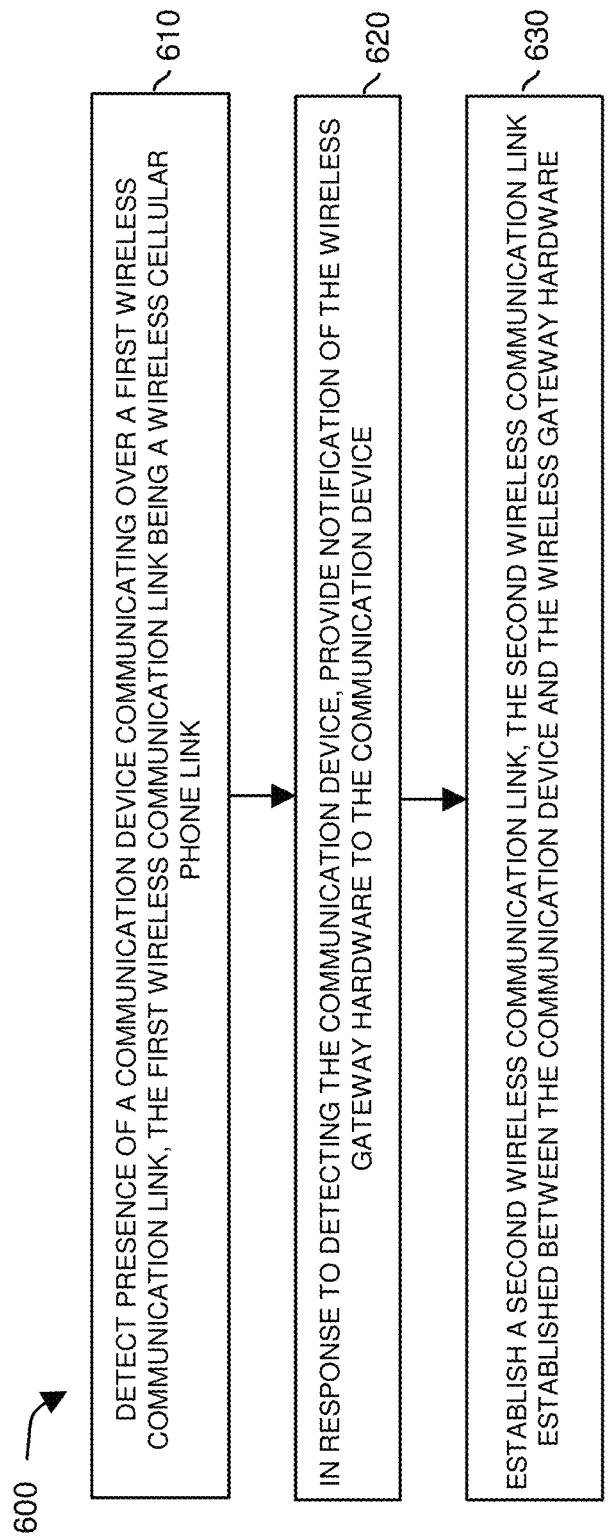
FIG. 6 is an example diagram illustrating a method of facilitating a wireless handoff according to embodiments herein.

FIG. 6 is a flowchart 600 illustrating an example method according to embodiments. Note that there will be some overlap with respect to concepts as discussed above. Note further that the processing in the flowcharts below can be executed in any suitable order. In one embodiment, the wireless gateway 140 represents wireless gateway hardware that controls access through communication portal 160 to shared communication link 191 via performing the following operations.

In processing block 610, the wireless gateway 140 detects presence of a communication device 110-1 communicating over a first wireless communication link 128 such as a wireless cellular phone link.

As previously discussed, the communication device 110-1 can detect presence of the communication device 110-1 in subscriber domain 150-1 in any suitable manner. For example, as previously discussed, the wireless gateway 140 can be configured to monitor a carrier frequency spectrum assigned to the communication device 110-1 to support wireless communications. Alternatively, note that the communication device 110-1 can be configured to transmit a wireless request signal over RF interface 185-2. The request signal can be a discovery request transmitted by the communication device 110-1 to learn of any wireless access points (such as any WiFi™ access points) present in a vicinity of the communication device 110-1. In accordance with this latter instance, the wireless gateway 140 detects presence of the communication device 110-1 via the wireless discovery request communication transmitted from the communication device 110-1 to the wireless gateway 140.

Accordingly, the wireless gateway 140 can detect presence of the communication device 110-1 in any number of ways.

In processing block 620, in response to detecting the communication device 110-1, the wireless gateway 140 provides notification of a presence of the wireless gateway 140 in the subscriber domain 150-1 to the communication device 110-1.

In processing block 630, in furtherance of performing a handoff, the wireless gateway 140 establishes a second wireless communication link 228 between the communication device 110-1 and the wireless gateway 140.

Figure 7:
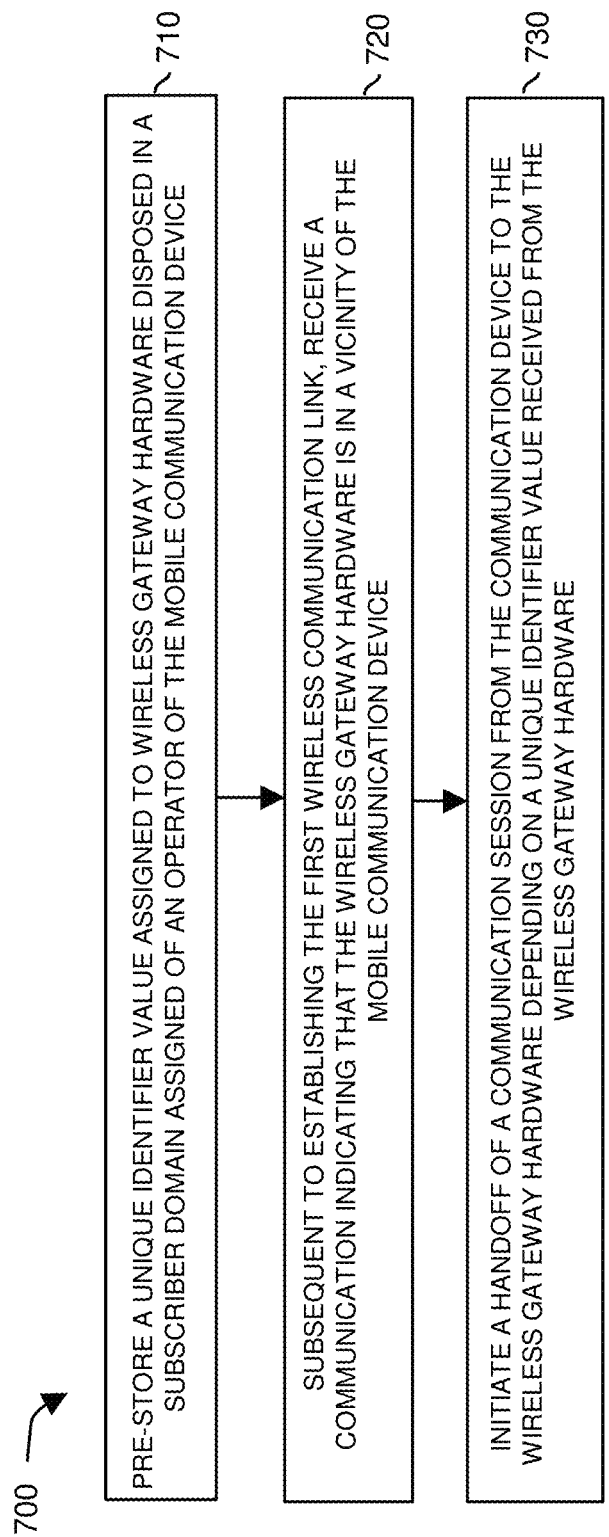
FIG. 7 is an example diagram illustrating a method of facilitating a wireless handoff according to embodiments herein.

FIG. 7 is a flowchart 700 illustrating an example method according to embodiments. Note that there will be some overlap with respect to concepts as discussed above. Note further that the processing in the flowcharts below can be executed in any suitable order. In one embodiment, the wireless gateway 140 represents wireless gateway hardware that controls access through communication portal 160 to shared communication link 191 via performing the following operations.

In processing block 710, the communication device 110-1 pre-stores a unique identifier value assigned to wireless gateway 140 disposed in a subscriber domain 150-1 assigned to an operator of the mobile communication device 110-1.

In processing block 720, subsequent to establishing the first wireless communication link 128, the communication device 110-1 receives a communication indicating that the wireless gateway 140 is in a vicinity of the mobile communication device 110-1.

In processing block 730, the communication device 110-1 initiates a handoff of a communication session to the wireless gateway 140 depending on a unique identifier value received from the wireless gateway hardware 140.

Note again that techniques herein are well suited for enabling handoffs in a respective network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    via computer processor hardware, performing operations of:
        monitoring a wireless frequency spectrum used by a mobile communication device to transmit wireless communications in a network environment;
        detecting presence of a communication session over the wireless frequency spectrum; and
        in response to detecting the communication session, wirelessly transmitting a notification indicating presence of wireless gateway hardware available to handoff the communication session.

2. The method as in claim 1, wherein the monitored wireless frequency spectrum is a cellular phone carrier frequency spectrum.

3. The method as in claim 2, wherein the wireless gateway hardware supports the handoff of the communication session over a non-cellular phone carrier frequency spectrum.

4. The method as in claim 1, wherein an operator of the mobile communication device provides input to control the handoff of the communication session.

5. The method as in claim 1, wherein the handoff depends on an ability of a shared communication link to support bandwidth required by the mobile communication device to support the communication session.

6. The method as in claim 1 further comprising:
    receiving a command generated by the mobile communication device to perform the handoff of the communication session to the wireless gateway hardware; and
    in accordance with the command, initiating the handoff of the communication session to the wireless gateway hardware.

7. The method as in claim 1 further comprising:
    receiving network session information indicating first data retrieved by the mobile communication device over the wireless frequency spectrum; and
    utilizing the network session information to retrieve second data over a shared communication link, the second data received over the shared communication link being a duplicate of the first data retrieved by the mobile communication device over the monitored wireless frequency spectrum.

8. The method as in claim 7, wherein the wireless frequency spectrum is a first wireless frequency spectrum, the method further comprising:
    initiating a handoff of the communication session over a second wireless frequency spectrum; and
    communicating a message over the second wireless frequency spectrum to the communication device, the message indicating a status of retrieving the second data at the wireless gateway hardware over the shared communication link.

9. The method as in claim 8 further comprising:
transmitting the second data over the second wireless frequency spectrum from the wireless gateway hardware to the communication device.

10. The method as in claim 1 further comprising:
at the wireless gateway hardware:
receiving identity information assigned to the mobile communication device; and
utilizing the identity information to verify that the communication device is authorized to perform the handoff of the communication session.

11. The method as in claim 1 further comprising:
utilizing map information to map an identity of the mobile communication device to a corresponding carrier frequency spectrum assigned to the mobile communication device.

12. The method as in claim 1 further comprising:
receiving bandwidth information indicating a corresponding bandwidth of the communication session; and
subsequent to verifying an ability of the wireless gateway hardware to support the communication session and corresponding bandwidth, initiating the handoff.

13. The method as in claim 1, wherein an operator of the mobile communication device subscribes to use of the monitored wireless frequency spectrum in accordance with a service agreement with a first communication service provider; and
wherein the operator of the mobile communication device subscribes to use of the wireless gateway hardware, the wireless gateway hardware provided in accordance with a service agreement with a second communication service provider, the first communication service provider operating independently with respect to the second communication service provider.

14. The method as in claim 1 further comprising:
receiving identity information from the communication device, the identity information assigned to the communication device to retrieve data over the first wireless communication link; and
utilizing the identity information to verify that the mobile communication device is authorized to perform a handoff of a respective communication link to the wireless gateway hardware.

15. The method as in claim 1, wherein the wireless gateway hardware resides in a first subscriber domain of multiple subscriber domains in a service group, each of the multiple subscriber domains coupled to a shared communication link, the method further comprising:
allocating a portion of bandwidth from the shared communication link to support handoffs from communication devices in the multiple subscriber domains.

16. The method as in claim 1 further comprising:
in response to transmitting the notification to the mobile communication device, receiving a request from the mobile communication device to perform the handoff.

17. The method as in claim 1, wherein detecting presence of the communication session includes:
in response to detecting communications in the wireless frequency spectrum above a threshold value, providing notification of the wireless gateway hardware to the communication device, the notification including a unique identifier value assigned to the wireless gateway hardware.

18. A system comprising:
computer processor hardware; and
a hardware storage resource coupled to communicate with the computer processor hardware, the hardware storage resource storing instructions that, when executed by the computer processor hardware, cause the computer processor hardware to:
monitor a wireless frequency spectrum used by a mobile communication device to wirelessly communicate in a network environment;
detect presence of a wireless communication session over the wireless frequency spectrum; and
in response to detecting the wireless communication session, wirelessly transmit a notification indicating presence of wireless gateway hardware available to handoff the communication session.

19. The computer system as in claim 18, wherein the monitored wireless frequency spectrum is a cellular phone carrier frequency spectrum.

20. The computer system as in claim 19, wherein the wireless gateway hardware supports the handoff of the communication session over a non-cellular phone carrier frequency spectrum.

21. The computer system as in claim 18, wherein an operator of the mobile communication device provides input to control the handoff of the communication session.

22. The computer system as in claim 18, wherein performing the handoff depends on an ability of a shared communication link to support bandwidth required by the mobile communication device to support the communication session.

23. The computer system as in claim 18, wherein the computer processor hardware further performs operations of:
receiving a command generated by the mobile communication device to perform the handoff of the communication session to the wireless gateway hardware; and
in accordance with the command, initiating the handoff of the communication session to the wireless gateway hardware.

24. The computer system as in claim 18, wherein the computer processor hardware is further operable to:
receive identity information assigned to the mobile communication device; and
utilize the identity information to verify that the communication device is authorized to perform the handoff of the communication session.

25. The computer system as in claim 18, wherein an operator of the mobile communication device subscribes to use of the monitored wireless frequency spectrum in accordance with a service agreement with a first communication service provider; and
wherein the operator of the mobile communication device subscribes to use of the wireless gateway hardware, the wireless gateway hardware provided in accordance with a service agreement with a second communication service provider, the first communication service provider operating independent of the second communication service provider.

26. The computer system as in claim 18, wherein the computer processor hardware is further operable to:
receive identity information from the communication device, the identity information assigned to the communication device to retrieve data over the first wireless communication link; and
utilize the identity information to verify that the mobile communication device is authorized to perform a handoff of a respective communication link to the wireless gateway hardware.

27. The computer system as in claim 18, wherein the wireless gateway hardware resides in a first subscriber domain of multiple subscriber domains in a service group, each of the multiple subscriber domains coupled to the shared communication link, the computer processor hardware further operable to:

allocate a portion of bandwidth from the shared communication link to support handoffs from communication devices in the multiple subscriber domains.

28. The computer system as in claim 18, wherein the computer processor hardware is further operable to:

in response to transmitting the notification to the mobile communication device, receive a request from the mobile communication device to perform the handoff.

29. The computer system as in claim 18, wherein the computer processor hardware is further operable to:

in response to detecting communications in the wireless frequency spectrum above a threshold value, provide notification of the wireless gateway hardware to the communication device, the notification including a unique identifier value assigned to the wireless gateway hardware.

30. Computer-readable storage hardware having instructions stored thereon, the instructions, when carried out by computer processor hardware, causing the computer processor hardware to:

monitor a wireless frequency spectrum assigned for use by a mobile communication device to wirelessly communicate in a network environment;

detect presence of a wireless communication session over the wireless frequency spectrum; and in response to detecting the wireless communication session, wirelessly transmit a notification indicating presence of wireless gateway hardware in which to handoff the communication session.

\* \* \* \* \*